United States Patent [19]
Steiger
[11] Patent Number: 5,000,624
[45] Date of Patent: Mar. 19, 1991

[54] POWDER PREPARATION SYSTEM FOR COATING POWDER

[75] Inventor: Peter Steiger, Herisau, Switzerland
[73] Assignee: Ransburg-Gema AG, Switzerland
[21] Appl. No.: 239,785
[22] Filed: Sep. 1, 1988
[30] Foreign Application Priority Data Sep. 4, 1987 [DE] Fed. Rep. of Germany ....... 3729705
Sep. 4, 1987 [DE] Fed. Rep. of Germany ....... 3729714
Sep. 4, 1987 [DE] Fed. Rep. of Germany ....... 3729728
Sep. 4, 1987 [DE] Fed. Rep. of Germany ....... 3729746

[51] Int. Cl.5 ........ B65G 53/36
[52] U.S. Cl. ........ 406/124; 406/146; 406/153; 406/48; 239/339; 427/240; 261/18.2; 261/115
[58] Field of Search ........ 406/124, 146, 151, 152, 406/153, 47, 48, 31, 32, 33; 239/339, 372; 219/362, 311, 328, 273; 236/44 C, 20 R; 118/600, 602; 427/240; 261/18.2, 81, 115

[56] References Cited

U.S. PATENT DOCUMENTS

| | | | |
|---|---|---|---|
| 2,171,932 | 9/1939 | Holmboe et al. | 239/339 |
| 2,289,329 | 7/1942 | Prickett | 406/146 |
| 2,392,177 | 1/1946 | Osterheld | 219/311 |
| 2,429,359 | 10/1947 | Kassel | 406/146 |
| 3,045,315 | 7/1962 | Dusenbury | 118/602 |
| 4,082,860 | 4/1978 | Corbett et al. | 427/27 |
| 4,101,682 | 7/1978 | Kunz | 426/482 |
| 4,101,685 | 7/1978 | Geary et al. | 427/8 |
| 4,371,295 | 2/1983 | Hart | 406/146 |
| 4,397,268 | 8/1983 | Brown | 261/18.2 |
| 4,500,560 | 2/1985 | Guffroy | 427/8 |
| 4,824,295 | 4/1989 | Sharpless | 406/144 |

FOREIGN PATENT DOCUMENTS

| | | | |
|---|---|---|---|
| 1777248 | 4/1970 | Fed. Rep. of Germany . | |
| 2616188 | 10/1976 | Fed. Rep. of Germany . | |
| 2627106 | 12/1976 | Fed. Rep. of Germany . | |
| 2643121 | 4/1977 | Fed. Rep. of Germany . | |
| 2551578 | 5/1977 | Fed. Rep. of Germany . | |
| 2311337 | 6/1977 | Fed. Rep. of Germany | 239/690 |
| 2659819 | 9/1977 | Fed. Rep. of Germany . | |
| 2710263 | 9/1977 | Fed. Rep. of Germany . | |
| 2636898 | 2/1978 | Fed. Rep. of Germany | 427/180 |
| 2745619 | 4/1979 | Fed. Rep. of Germany . | |
| 3006861 | 9/1981 | Fed. Rep. of Germany . | |
| 3602388C1 | 3/1987 | Fed. Rep. of Germany | 427/182 |
| 2343818 | 12/1962 | France . | |
| 1347012 | 11/1963 | France . | |
| 7607410 | 3/1976 | France . | |
| 57-50572 | 7/1982 | Japan . | |
| 529590 | 12/1972 | Switzerland . | |

OTHER PUBLICATIONS

German journal "*Mitteilungen des Vereins deutscher Emailfachleute*", Sep. 1978, pp. 113-117.
German journal "*Metalloberflache*", 1978, pp. 444-449.
German journal "*Mitteilungen des Vereins deutscher Emailfachleute*", 1975, pp. 122-124 and 127-131.
German journal *Mitt. des Vereins deutscher Emailfachleute,* 1985, pp. 91-96; 1984, pp. 121-126; 1976, pp. 30-33.
German journal "*Metalloberflache*", 1987, pp. 155-158.
Dietzel, "*Emaillierung*", 1981, Springer Verlag, pp. 218-220.
W. Luck, "*Feuchtigkeit*", R. Oldenburg Munchen, Wien, 1964, pp. 200-207 and pp. 258-273.

*Primary Examiner*—Joseph F. Peters, Jr.
*Assistant Examiner*—Christopher P. Ellis
*Attorney, Agent, or Firm*—Ostrolenk, Faber, Gerb & Soffen

[57] ABSTRACT

Fluidized powder in a powder preparation container is treated to impart to it a desired moisture content through the feeding into the fluidized powder of a stream of compressed air whose moisture content and temperature have been carefully regulated. Powder in the preparation container which has attained the desired moisture content is then transferred to a powder holding container and from there to a spraying device by which spraying device the powder is electrostatically charged and sprayed on articles. Further, the powder preparation container is heated along several distinct heating zones which are arranged one above the other along the axis, i.e. height, of the container. The powder in the powder preparation container is stratified with the powder at the bottom of the container being affected only negligibly by the continuous introduction of fresh powder through the top of the container.

27 Claims, 5 Drawing Sheets

POWDER PREPARATION SYSTEM FOR COATING POWDER

BACKGROUND OF THE INVENTION

The present invention relates to a system for preparing coating powder, particularly enamel powder, for spraying on various articles.

A powder preparation system which is part of a system for spraying enamel powder on articles is known from U.S. Pat. No. 4,500,560. In this known system, air is fed continuously through a perforated bottom of a powder preparation container to maintain the powder in a fluidized state. To moisten the enamel powder and to maintain the moisture at a given value, a vapor is fed into the container at a rate depending on the moisture content of the mixture of enamel powder and air in the container. The fluidized/moistened powder is then delivered to a spraying device by means of a Venturi based, gas operated, injector which is coupled to the interior of the container and designed to draw powder from the container. The suction effect of the injector is variable and controlled by the amount of air applied to the injector.

Another powder preparation system, for enamel or other coating powders, includes a preparation container for preparing fluidized powder and is described in Federal Republic of Germany Patent No. 36 02 388 (U.S. Pat. Application Ser. No. 006,952). In the container there is an elongated bell which is immersed into the fluidized powder with the open end of the bell facing down. As occurs with an upside down cup that is immersed in water, an air pocket is developed in the bell which prevents the fluidized powder from entering into the bell. Consequently, the height or level of fluidized powder within the bell is lower than outside the bell. Within the bell, several fluid inlets are disposed for the purpose of spraying water vapor or water into the fluidized powder to moisten the powder from within the bell.

Other powder coating systems using enamel powder are known from French Patent No. 1347012 which describes, for example, a mechanism for producing water vapor for moistening enamel powder. The vapor producing mechanism is disposed below the article to be coated while the article is sprayed with enamel powder from a spraying device. In another embodiment, water is mixed by means of spray nozzles into the spray jet of enamel powder which is directed at the article to be coated from a spraying device.

Enamel powder, like plastic and other powders that are suitable for forming a coating on an object, is electrostatically charged to cause the powder to be drawn to and remain adhered to an article on which it is sprayed. The article to be coated is normally connected to a ground potential so as to attract the powder which is charged to a high electrical potential.

Certain types of powders, particularly enamel powders, have the drawback that they can not be charged electrostatically to a degree that would cause the powder particles to arrive at and remain adhered to the article being sprayed. To overcome the problem, additional agents are typically admixed with the enamel. One such agent is silicone which allows enamel powder to be charged electrostatically more vigorously. To improve the quality of the coating on an article, enamel powder is additionally moistened with water or water vapor prior to being sprayed onto an article.

However, powder that is insufficiently moistened can not be charged effectively. As a result, the quality of the coating is poor and the coating process is inefficient because a large number of powder particles never reach or bounce off the article. On the other hand, a powder can not be overmoistened because overmoistened powder does not adhere well to an article to be coated. The key factor is the electrical conductivity of the powder which varies based on the moisture content of the powder. Accordingly, it is important to provide an ability to control the moisture content of the powder accurately and over a wide range of moisture values.

SUMMARY OF THE INVENTION

It is a primary object of the present invention to provide an improved powder preparation system for coating powder, particularly enamel powder, wherein the electrical conductivity, i.e. moisture content, of coating powder is more optimally controllable, both qualitatively and temporally.

The foregoing and other objects of the invention are realized in that fluidized powder is moistened, in accordance with the present invention, in a preparation container through the feeding into the container of a stream of compressed air whose moisture and temperature are carefully adjusted such as to impart to the powder in the container just the right and desired amount of moisture. From the preparation container, the carefully moistened fluidized powder is transferred to a powder holding container from which the powder is then supplied to a spraying device for being sprayed onto articles to be coated.

Further, the powder preparation container may be provided with a heating apparatus which includes several separately heatable heating elements extending around the wall of the powder preparation container and spaced away from one another along the axis of the container to provide distinct, axially extending, heating zones in the container.

The invention affords several advantages. One advantage resides in the invention's ability to produce coating powder having optimal electrical conductivity in a relatively short time. Moreover, the powder retains its optimal electrical conductivity for relatively longer periods of time, for example several weeks. Powder prepared in accordance with the present invention does not require an air-conditioned spray-coating booth. Moreover, coating powder which is moistened in accordance with the present invention can be conveyed by means of a jet of compressed air to a spray device where it is electrostatically charged and sprayed onto articles. Moistening the powder by means of compressed air whose moisture content is adjustable enables more precise maintaining of the moisture content of the coating powder and furthermore allows relatively low moisture contents to be developed in powdered enamel. This is not obtainable by moistening powder with water vapor because water vapor by definition has a 100% humidity and therefore a nonadjustable water content. Further, when the feeding of vapor is interrupted for any reason, at least about 10 minutes is required for heating the vapor conduits and for discharging therefrom the condensation waters.

Other features and advantages of the present invention will become apparent from the following description of the invention which refers to the accompanying drawings.

DETAILED DESCRIPTION OF THE DRAWINGS

The powder preparation system of the present invention is described below in connection with a powder coating system of which it is normally a component part. However, the various, below described, elements of the powder preparation system, with the exception of the spraying device 10, may be utilized in the production of powder, for example, in an enamel-producing mill. The applicability and use of the invention is not limited, therefore, to any particular type of powder or system.

Figure 1:
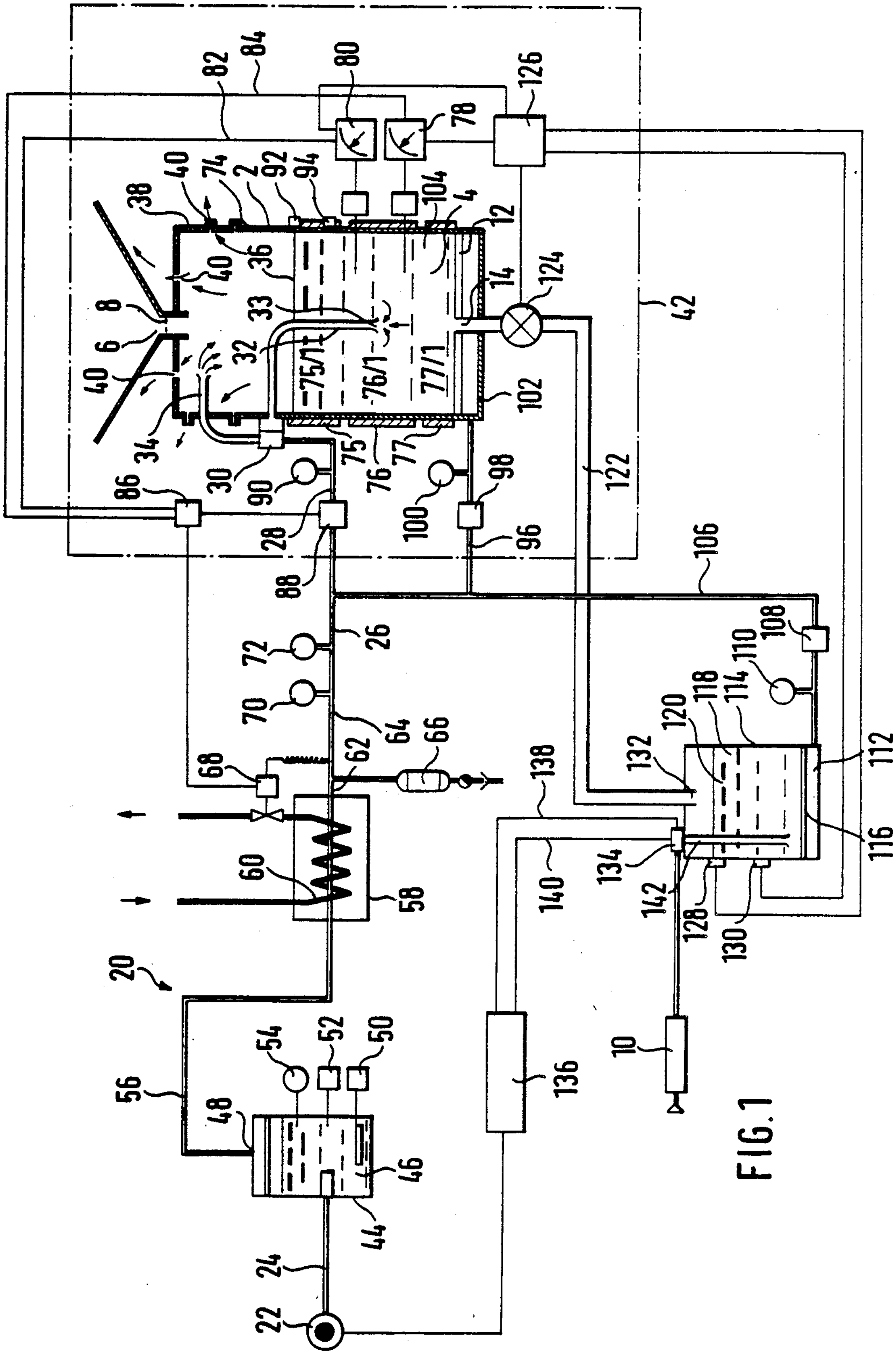
FIG. 1 is a schematic block diagram of a powder coating system including a powder preparation system for preparing powder, preferably enamel powder, in accordance with the present invention.

Referring to FIG. 1, a container 2 for preparing fluidized powder 4, for example enamel powder, is provided with a powder inlet 6 in which are arranged a metal separator and a screening machine 8. Both fresh powder and recovered powder are introduced into the container 2 through the powder inlet 6. Recovered powder refers to recycled powder which either did not reach or has bounced off from an article being sprayed. Fluidized and properly moistened powder 4 is drawn from the container 2 through on outlet 14 that is located at the center of the perforated intermediate bottom 12 of the container 2 for being fed to powder holding container 114 through a transfer line 122.

The fluidized powder 4 disposed within container 2 is carefully and precisely moistened by means of a compressed-gas conditioning device 20 which delivers into the powder 4 a moistened jet of compressed gas, for example, air. The conditioning device 20 has a compressed-air inlet 24 that is connected to a source of compressed-air 22 and a compressed-air outlet 26. The outlet 26 lies nearer the container 2 and the conditioned stream of compressed-air produced in the conditioning device 20 is discharged therefrom into the container 2. "Conditioned", as in "conditioned stream of compressed air", means and refers to compressed-air which has been subjected to a special treatment in which the moisture content and temperature of the compressed-air has been carefully adjusted to desired values.

The outlet 26 for the conditioned compressed air is connected by a fluid line 28 to an injector 30 which abuts the wall 74 of container 2 and which has connected to it a powder suction line 32 and a fluid air inlet 34. Compressed-air passing through the injector 30 creates, as a result of the Venturi effect, a vacuum which draws the powder 4 through the opening 33 in the suction line 32, intermixes it with the compressed-gas flowing in from outlet 26, and discharges the mixture back into container 2 through the inlet 34. Preferably, the opening 33 of suction line 32 is located at about the center of the space occupied by the powder 4 in the container 2. Note that the fluid inlet 34 opens above the surface 36 of the fluidized powder 44 of the preparation container 2. Venturi based pneumatic injectors are well known, an embodiment thereof being described in U.S. Pat. No. 4,500,560.

A hood 38 which encloses the top of the container 2 contains several small air vent openings 40 through which excess gas may escape from container 2. The powder inlet 6 and the fluid inlet 34 enter container 2 at the hood 38 and the entire container 2 is disposed within an air-conditioned space 42.

The compressed-air source 22 from which the compressed-air conditioning device 20 draws its air may be an ordinary compressed-air network which supplies compressed-air at about 25° C. and a humidity of 5%.

The compressed-air conditioning device 20 further includes a moistener 44 containing water 46 and coupled to a heater 50 and a thermostat 52 which operate together to maintain the water at an elevated temperature the precise value of which is displayed by means of a thermometer 54. As the compressed-air from the source 22 flows into and through the water 46 it absorbs a large amount of moisture from the water 46 as a result of the elevated temperature of the water which is maintained at a temperature of, for example, 50° C.

The temperature and humidity of the moistened compressed-air, as it exits the outlet 48, are respectively at about 45° C. and 90% humidity. Thereafter, the moistened compressed-air passes to a water based cooler 58 via a conduit 56. At the cooler 58, the moist compressed-air is cooled to a temperature of, for instance, about 25° C. and its humidity therefore rises to 100%. The cooler 58 includes a water cooled circuit 60 and an outlet conduit 64 through which the cooled compressed-air emerges from the cooler 58. A centrifugal separator 66 which is coupled to the conduit 64 serves to remove condensation water which precipitates from the compressed-gas as it is cooled. The compressed-air conditioning device 20 further includes a temperature regulator 68 for regulating the temperature of the water in the water cooling circuit 60 as a function of the temperature in the outlet line 64 as well as a thermometer 70 and a pressure gauge 72 which respectively provide temperature and pressure readings.

Three electric heaters 75, 76 and 77, constituted of heating pads or the like, surround the wall 74 of container 2 and are disposed, in an axially spaced relationship, i.e. one above the other, starting at the intermediate bottom 12 of container 2 and extending to about the height of the powder surface 36. The temperature of each heater 75, 76 and 77 is individually adjustable, for example, electrically, but they may be controllably heated by other means, for example, by hot water or steam instead of electrically. In either case, the heading pads 75, 76 and 77 serve to create in the powder 4 three distinct heating zones 75/1, 76/1 and 77/1 which overlie one another. The supplied heat evaporates the water in the various zones whenever the moisture content of the fluidized enamel powder 4 is too high.

The largest variation/fluctuation in the moisture content of the powder 4 occurs in the uppermost heating zone 75/1 because of the fresh and recovered powder which is constantly introduced via the powder inlet 6. A lesser, but finite, moisture variation occurs in the intermediate heating zone 76/1 as a result of the constant drawing of powder from the middle of the powder 4 through the inlet opening 33 of suction tube 32. The moisture content is most stable in the powder located in the lowest heating zone 77/1 which lies furthest from the powder inlet 6. Consequently, fluidized powder is drawn out of container 2 through the powder outlet 14, i.e. from the lowermost heating zone 77/1. The invention thus enables continuous or intermittent drawing of fluidized powder whose moisture content is quite constant. Moreover, powder having a very low and a precisely regulated moisture content is obtainable from the powder preparation system of the present invention. The provision of several independently controlled heating zones results in lower heating energy requirements as compared to the heating energy that would be required if only a single heating zone were to be provided.

The temperature and moisture content of the fluidized enamel powder in container 2 are measured by a temperature measuring device 78 and a moisture measuring device 80. An air-conditioning regulator 86 responds, via control lines 82 and 84, to the temperature and moisture measurements provided by the devices 78 and 80. A pressure regulator 88, which is disposed in the fluid line 28 of injector 30, is opened or closed to a greater or lesser extent as a function of the measured temperature and moisture by means of the air-conditioning regulator 86. Thereby, the feeding of conditioned compressed air through fluid inlet 34 is regulated. The air-conditioning regulator 86 further controls the regulator 68 of the water cooled circuit 60 as a function of the measured temperature and moisture of the fluidized powder 4. The pressure of the compressed air in fluid line 28 is measured by and displayed on the pressure gauge 90.

The height of the powder surface 36 in the container 2 is sensed and regulated by means of the level regulators 92 and 94 which are disposed, one above the other, in the container 2.

Through a branch line 96, a portion of the compressed air issuing from the outlet 26 of the compressed-air conditioning device 20 is diverted into the space 102 below the perforated intermediate bottom 12 of container 2. This portion of the compressed air passes into the powder space 104 through the perforated bottom 12 and serves to fluidize the enamel powder 4. The pressure regulator 98 in the branch line 96 regulates the pressure of the air being delivered which pressure is displayed by means of a pressure gauge 100.

Through a further branch line 106, another portion of the compressed air flowing in the outlet 26 is supplied to a lower intermediate space 112 that is located below the perforated intermediate bottom 116 of a coating powder holding container 114. The branch line 106 is provided with a pressure regulator 108 and a pressure gauge 110. The conditioned air flowing through the branch line 106 flows through the perforated intermediate bottom 116 into a space 118 where it maintains the enamel powder 120 located there in a fluidized state. The enamel powder 120 in the holding container 114 will have the desired moisture content and temperature as it is supplied from the powder preparation container 2.

The powder 120 that is drawn from the container 2 via the powder outlet 14 of container 2 flows through transfer line 122 and emerges through the opening 132 thereof. A powder-feed controlling device 124, disposed in the transfer line 122 and comprised of a pump, star feeder or a like charging valve, regulates the powder flow rate to the container 114 under control of a controlling device 126. The controlling device 126 is coupled to the moisture and measuring devices 78 and 80 and to the level regulators 128 and 130 of holding container 114 and has the function of allowing powder to be transferred only when the powder in container 2 has the desired moisture and temperature and only when the level regulators 128 and 130 indicate that the coating container 114 is ready to receive additional enamel powder. Because the powder outlet 14 is at the lowest point in container 2 only enamel powder which has a stable and correct moisture and temperature will be removed from the container 2 as the enamel powder at the outlet 14 remains unaffected by powder circulating in the upper regions of container 2 as a result of the action of the injector 30 and its suction tube 32 or by the constant introduction of fresh and recovered enamel powder through the powder inlet 6 above powder surface 36.

Conditioned enamel powder in container 114 is then delivered to a spray head 10 by means of a second injector 134. The injector 134 receives air from the compressed-air supply 22 through a controller 136 which supplies to the injector 134 a powder conveying air supply through a line 138 and control air via line 140. As a result of the Venturi vacuum created in the injector 134 the enamel powder 120 is drawn up the suction tube 142 and is delivered to the spray device 10.

The feeding of the same conditioned air from outlet 26 to different locations in the coating apparatus, including to the recirculation circuit in container 2 and to the gas chambers below the perforated bottoms 12 and 116 of containers 2 and 114, results in a highly stable coating system in which the desired moisture content and temperature of the powder can be maintained very accurately and in which relatively low moisture values and any desired temperatures can be produced and maintained.

Figure 2:
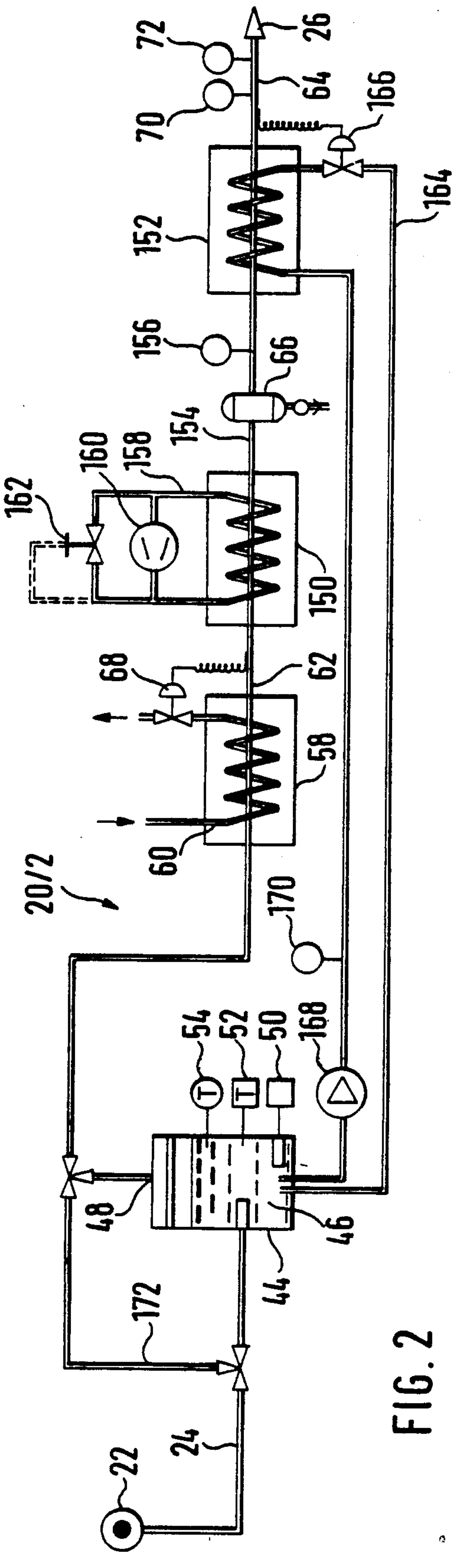
FIG. 2 illustrates a particular embodiment of a compressed-air conditioning device for conditioning air that is supplied for moistening powder located in a powder preparation container.

FIG. 2 illustrates a further embodiment of a compressed-gas conditioning device 20/2 which includes all of the elements (identified by identical reference numerals) of the compressed-gas conditioning device 20 of FIG. 1. However, the conditioning device 20/2 also includes a non-water-based second cooler 150 for subjecting the compressed air to a further cooling and a heating device 152 for reheating of the compressed air for the purpose that is described further below. The second cooler 150 is located downstream of the water-cooled cooler 58 while the heating device 152 is located further downstream, directly upstream of the outlet 26 of compressed-air conduit 64. Note that in this embodiment the centrifugal separator 66 is located between the second cooler 150 and the heating device 152, at the connecting line 154 therebetween. A thermometer 156 which is connected to the line 154 provides a reading of the instantaneous temperature of the stream of compressed air.

The second cooler 150 contains a coolant circuit 158 including a coolant compressor 160 and a regulator 162 which operate to cool the air in the conduit 154 to a temperature which is lower than the 25° C. to which the stream of air is cooled by the first cooler 58.

The heating device 152 includes a heating circuit 164 and a temperature regulator 166. A pump 168 in the heating circuit 164 circulates heated fluid from the compressed-air moistener 44 for heating the compressed air flowing through heater 152. The pressure of the fluid being pumped by pump 168 is indicated by a pressure gauge 170. Furthermore in the embodiment of FIG. 2, a return fluid line 172 which is also connected to the outlet 48 of the moistener 44 returns a portion of the gas to the compressed-air inlet 24 to produce a more regulated stream of compressed air.

Figure 3:
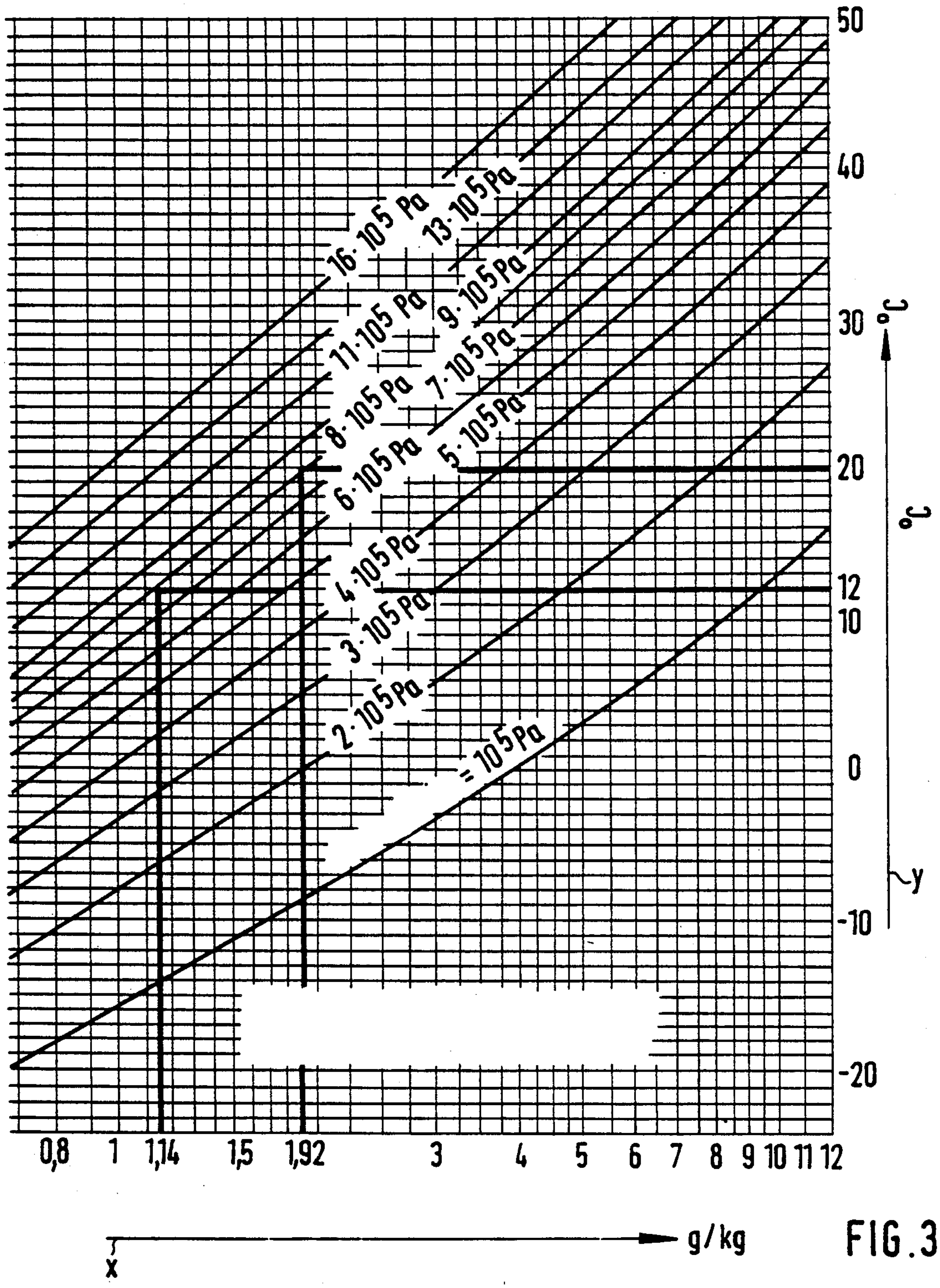
FIG. 3 is a graph which shows the water-vapor saturation limit curves of compressed air for different air pressures, where the water content is plotted, in grams per kilogram of dry air, on the x-axis and the temperature of the compressed air is plotted, in degrees Celcius, on the y-axis.

The compressed-air conditioning device 20/2 allows the temperature of the moisture laden compressed-air to be accurately adjusted anywhere between 3° C. to 60° C. Also, through the reheating of the air in the heating device 152, the moisture content of the air can be very precisely regulated. It is also noted that the temperature of the air passing into the container 2 should always be about 10% above the temperature of the air issuing from the source of compressed air 22. The manner in which the compressed air is "conditioned" by means of the devices 20 or 20/2 of FIGS. 1 and 2, respectively, is explained below by reference to FIG. 3. "Conditioned" as used herein means air which has been processed and otherwise treated to have a desired temperature and a desired moisture content and which is maintained,, through constant adjustments, to remain at that state. FIG. 3 shows water-vapor saturation limit curves, i.e. the curves corresponding to a humidity of 100%, for compressed air at different pressures in grams of water per kilogram of dry air as a function of temperature in degrees Celsius. The water content in grams per kilogram of dry air is plotted on the x-axis and the temperature in degrees Celsius on the y-axis. FIG. 3 provides water-vapor saturation limit curves for a pressure of $1\times1.02\times10^5$ Pa (Pa=atmospheric pressure); $2\times1.02\times10^5$ Pa; $3\times1.02\times10^5$ Pa; $4\times1.02\times10^5$ Pa; $5\times1.02\times10^5$ Pa; $6\times1.02\times10^5$ Pa; $7\times1.02\times10^5$ Pa; $8\times1.02\times10^5$ Pa; $9\times1.02\times10^5$ Pa; $11\times1.02\times10^5$ Pa; $13\times1.02\times10^5$ Pa; and $16\times1.02\times10^5$ Pa.

By reference to a specific example, the process of adjusting the moisture content of the compressed gas is explained below. Let it be assumed that it is desired to impart to a stream of compressed air, having a pressure of $8\times1.02\times10^5$ Pa and a temperature of 20° C., a relative humidity of 60%. From FIG. 3, it is determined that the water-vapor saturation limit, and thus the water content of air, is 1.92 grams of water per kilogram of dry air for air at a temperature of 20° C. and a pressure of $8\times1.02\times10^5$ Pa. The 1.92 water content figure corresponds to a relative humidity of 100%. To obtain a 60% relative humidity requires, therefore, a water content of about 1.15 grams of water per kilogram, i.e. 60% of 1.92.

From FIG. 3 one may further determine that the dew point of air having a water content of 1.15 grams per kilogram of air at a pressure of $8\times1.02\times10^5$ Pa occurs at 12° C. (air saturated with water vapor). This allows obtaining of the desired relative humidity of 60% by controlling the powder regulator 162 of the coolant cooler 150 in FIG. 2 to cool the air to 12° C. The cooling of the air will bring about condensation which will leave 1.15 grams of water per kilogram of air, resulting in a 60% relative humidity. For this example, the fluid in the moistener 44 may be maintained at a temperature of about 35° C. and the temperature regulator 68 associated with the watercoolant cooler 58 may be adjusted to cool the air to a temperature of about 20° C.

Figure 4:
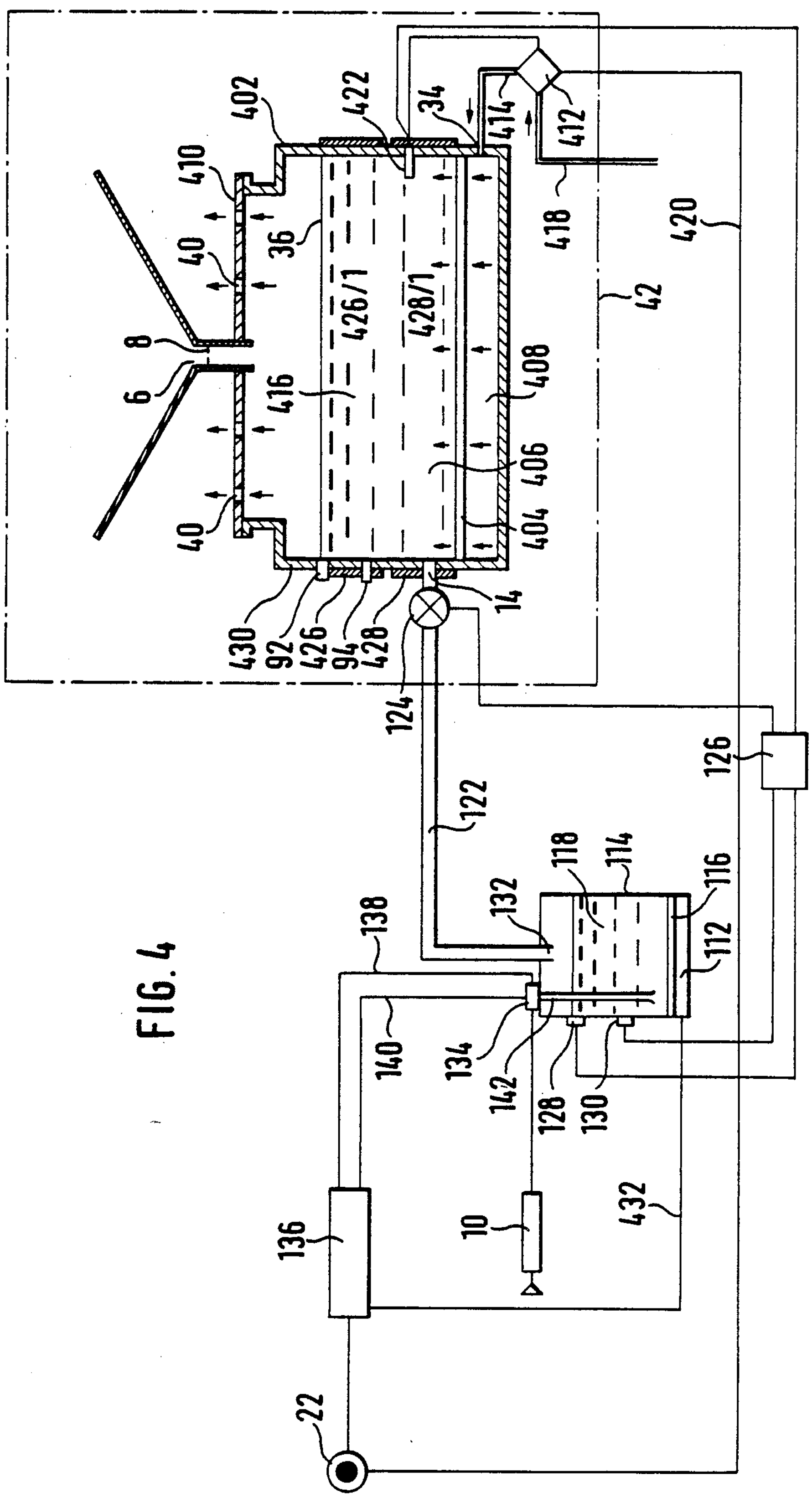
FIG. 4 depicts yet another embodiment of a powder preparation according to the invention.

A modified powder preparation container 402 is illustrated in FIG. 4. It includes a perforated intermediate bottom 404 which divides the interior of container 402 into a powder chamber 406 above the bottom 404 and a compressed-air space 408 below the bottom 404. Fresh and recovered enamel powder is delivered into the powder chamber 406 through powder inlet 6 having a metal separator and a screening device 8 and located in the center of a cover 410 containing perforations 40. The compressed air space 408 is supplied with a stream of compressed air from a compressed-air conditioning device 412 through an outlet 414. The compressed air, which has been previously treated to have a desired temperature and moisture content, flows into the powder chamber 406 through the perforated intermediate bottom 404 to maintain the powder 406 in a fluidized state. This gas is vented via the openings 40 in the cover 410.

The device 412 which produces the conditioned air is a compressed-air water atomizer to which water is fed from a water line 418 and air from a source of compressed air 22 via a gas line 420. The stream of compressed air from gas line 420 atomizes the water delivered from water line 418 and, at the same time, picks up a certain amount of moisture. A sensor 422 measures the moisture content and the temperature of the particles of enamel powder in the preparation container 402 and, as a function thereof, regulates the temperature and moisture content of the stream of compressed air to precisely maintain the enamel at a desired moisture and temperature.

The powder preparation container 402 of the present embodiment is further provided with two heaters 426 and 428, constituted by electric heating mats, which are arranged one above the other on the wall 430 of the container 402 and which are separately and independently heatable. The mats 426 and 428 create a lower heating zone 428/1 and an upper heating zone 426/1, each covering about one-half of the powder space 406. As a result, enamel powder which has been treated to have a desired moisture content and temperature may be removed by means of the pump 124 from the lower half (heating zone 428/1) of the powder chamber 406 via transfer line 122. At the same time, preparation of enamel powder located in the upper half of the powder chamber 406 which may not have as yet reached a desired moisture content and temperature may continue in the upper half of the chamber 406 without disturbing the powder in the lower half. The variations in temperature and moisture content are naturally substantially greater in the upper half of the powder chamber 406 since enamel powder is normally continuously or intermittently fed into the upper half. The height of the powder surface 36 in the powder preparation container 402 may be regulated by means of level regulators 92 and 92, as in the embodiment of FIG. 1.

The powder transfer line 122 extends from the powder outlet 14 of container 402 and terminates at the powder inlet 132 which is disposed within the powder holding container 114. As in the previously described embodiments, the container 114 includes a perforated intermediate bottom 116, a compressed-air space 112, and a powder space 118.

A controlling device 136, connected to the source of compressed air 22, directs compressed-air through line 432 into the compressed-air space 412 for maintaining the enamel powder 118 in container 114 in a fluidized state. The height of the powder in the container 114 is regulated by another controlling unit 126 which responds to signals received from the level regulators 128 and 130 to control the powder transfer pump 124 to deliver correct amounts of powder from container 402 to container 114. For the purpose of delivering powder from the container 114 to the spray heat 10, air from the source of compressed air 22 also flows via fluid line 138 through an injector 134. In the injector 134 this air flow creates a Venturi vacuum which serves to draw into the injector 134, via a suction line 142, powder which is then carried with the main air flow to the spray head 10. In the spray device 10 the powder is electrostatically charged and sprayed onto articles. The rate at which powder is delivered to spray device 10 is regulated by means of the controlling air which is delivered via fluid line 140 from controlling device 136.

Figure 5:
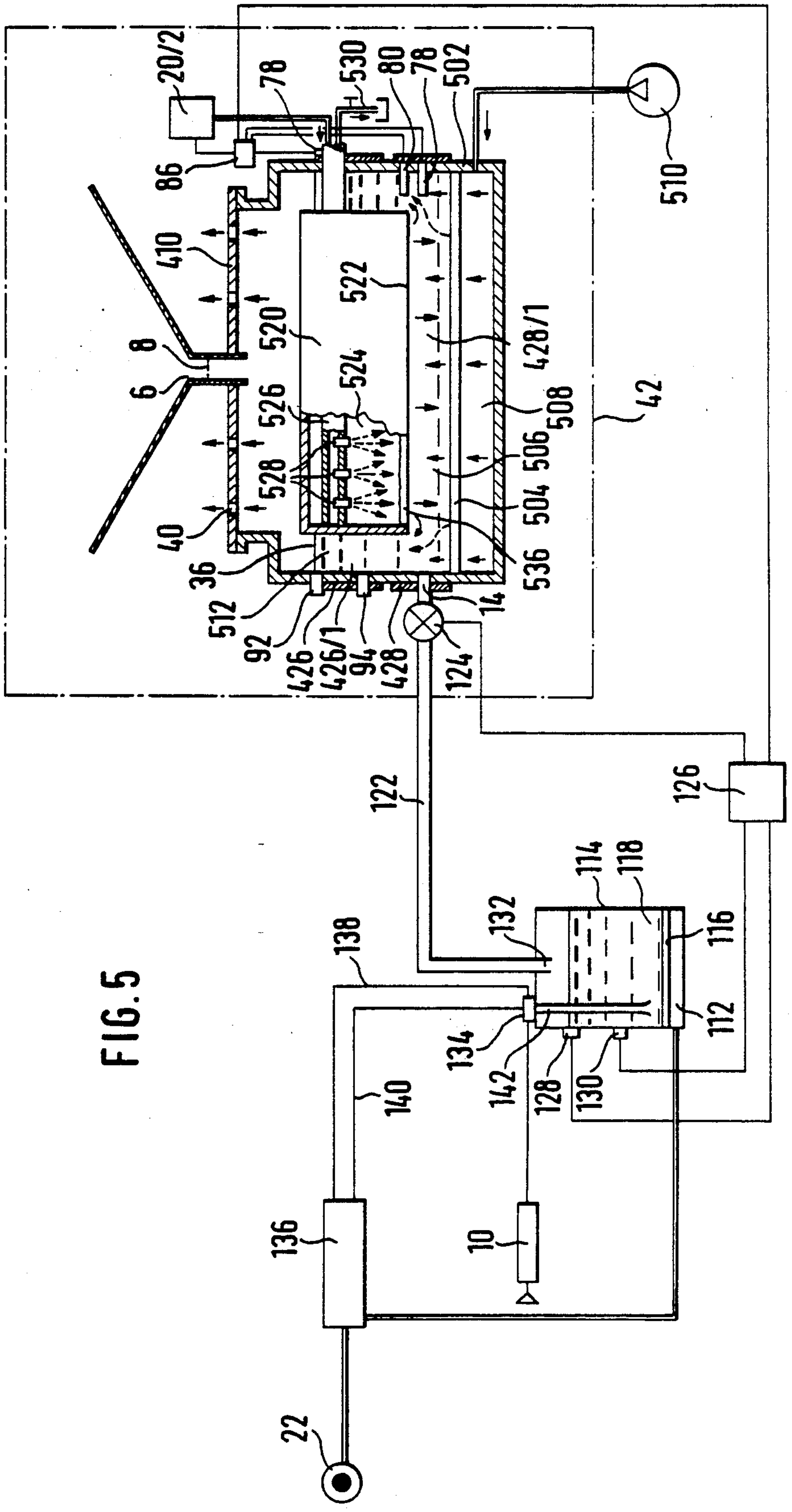
FIG. 5 a still further embodiment of a powder preparation system, particularly for use in connection with enamel powder, according to the present invention.

Referring to FIG. 5, a further embodiment of the invention includes a powder preparation container 502 having a perforated intermediate bottom 504 which divides the interior of the container into a powder space 506 and a compressed-air space 508 below the bottom 504. Compressed air flows from a source of compressed-air 510 into the gas space 508 and through the perforated bottom 504 into the powder space 506 to fluidize the powder 512. The height of the surface 36 of the powder 512 is regulated by level regulators 92 and 94.

A trough-shaped bell 520 having an open and downwardly facing end 522 is immersed in the powder 512. The bell 520 is airtight. As a result, the air pocket and resulting higher pressure within the bell 520 prevent powder from entering and filing the interior of the bell 520. Consequently, the surface 536 within the bell 520 is lower than is the surface 36 of the powder outside the bell. The bell 520 therefore creates a powder free space 524 within the bell. A pipe 526 having a plurality of nozzles 528 extends through the bell 520 and has connected to it, at a point outside the container 502, a compressed-air conditioning device 20/2, identical to that of FIG. 2. From the device 20/2 compressed and moist air flows via the nozzles 528 into the bell space 524. The moist air then passes through the lower opening 522 of the bell 520 into the fluidized powder 512 where it distributes itself substantially evenly over the entire crosssection of the container to enable distributing of very finely controlled dosages of moistened and warmed air within the powder 512. Note that condensation water in the line 526 is dischargeable through an outlet 536.

Similarly to FIG. 1, a moisture measuring device 80 and a temperature measuring device 78 allow the moisture content and the temperature of the compressed air in the line 526 to be regulated by means of an air-conditioning regulator 86. The regulator 86 also provides an output to a control unit 126 which controls the transfer of powder from the powder preparation container 502 to the holding container 114 via the transfer line 122 and the pump 124.

As in the other embodiments, the powder holding container 114 is provided with an injector 134 for delivering powder to a spraying device 10 for the electrostatic coating of articles Further as before, the powder preparation container 502 includes heaters 426 and 428, located one above the other, for providing zoned regulation of the moisture of the enamel powder along heating zones 426/1 and 428/1 in container 502.

All embodiments of the invention share the following advantages:

1. By using compressed air whose moisture content and temperature are regulated, the invention enables very precise adjusting of the moisture content and therefore the electrical conductivity of the coating powder over a wide range including very low moisture contents, without loss of accuracy.
2. The dividing of the powder preparation container into several, separately controllable heating zones allows continuous drawing of properly conditioned coating powder from the powder preparation container without interrupting the feeding of fresh and recovered powder into the preparation container. This is accomplished without impairing the quality, as measured by moisture and temperature, of the powder being delivered from the powder preparation container.
3. The use of a separate powder holding container 114 provides the advantage that only powder which has the correct moisture and temperature is fed to the spraying device 10, regardless of variations in the moisture content and temperature which may develop in the powder preparation container 2, 402 or 502.
4. The invention enables preparing of enamel powder having a moisture content within the range of 0.04 to 0.08 wt. %, and preferably 0.06 wt. % which corresponds to 0.06 grams of water per 100 grams of dry powder. At this moisture value, all particles of enamel powder are capable of being sufficiently charged electrostatically to allow them to adhere very well to an article being sprayed and to form a smooth layer thereon.

"Dry powder" as used herein means powder obtained by heating powder for about ten hours in an open vessel at a temperature of at least 100° C. and preferably at a temperature of about 120° C.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A powder preparation system, comprising:

a first container for preparing coating material having a predetermined moisture content;

means for maintaining the coating material in the first container in a fluidized state;

coating material moistening means for moistening the coating material, the coating material moistening means including;

(a) means for supplying a stream of compressed-gas; and (b) gas moistening means for moistening the stream of compressed-gas and regulating the moisture content in the compressed-gas to produce conditioned compressed-gas that is effective for imparting to the coating material the predetermined moisture content upon the mixing thereof with the conditioned compressed-gas, the gas moistening means comprising a water moistener and means for passing the compressed-gas through the water moistener to enable the compressed-gas to absorb moisture from the water moistener;

a first cooler for cooling the compressed-gas upon the emergence thereof from the moistener to condense a portion of the water from the gas to produce the conditioned compressed-gas;

an airtight bell having a substantially open bottom, the bell being disposed in the container and at least partially immersed in the coating material with the open bottom facing down to create a material free space within the bell;

means for directing the conditioned compressed-gas into the bell for distributing the conditioned compressed-gas through the open bottom of the bell;

means for heating water in the water moistener to a temperature higher than a temperature of the coating material in the preparation container, the first cooler being effective to cool the compressed-air to a temperature which is not lower than the temperature prevailing in the preparation container but which is lower than the temperature prevailing in the water moistener; and a Venturi injector coupled to the first container and effective for drawing coating material from the first container, mixing same with the conditioned compressed-gas, and returning a mixture of the coating material and compressed-gas to the first container.

2. The powder preparation system of claim 1, further comprising heating means for independently and controllably applying heat to the coating material in the first container along different, axially differentiated, heating zones.

3. The powder preparation system of claim 1, further comprising a second container for receiving from the first container and storing moistened coating material having the predetermined moisture content.

4. The powder preparation system of claim 3, further comprising a coating material spray device and means for supplying the moistened coating material from the second container to the spray device.

5. The powder preparation system of claim 1, wherein the gas moistening means further comprises a second cooler disposed downstream of the first cooler and effective for further cooling of the compressed-gas.

6. The powder preparation system of claim 1, further comprising heating means disposed downstream of the first cooler for heating the compressed-gas to a predetermined temperature.

7. The powder preparation system of claim 1, further comprising a centrifugal separator for centrifuging condensate water from the compressed-gas.

8. The powder preparation system of claim 1, wherein the first container includes a perforated bottom and further including means for directing a portion of the conditioned compressed-gas into the first container through the perforated bottom for fluidizing the coating material.

9. The powder preparation system of claim 3, wherein the second container comprises a perforated bottom and including means for directing a portion of the compressed-gas into the second container through the perforated bottom of the second container.

10. The powder preparation system of claim 1, wherein the gas moistening means comprises an atomizer.

11. The powder preparation system of claim 1, wherein the compressed-gas comprises compressed air.

12. The powder preparation system of claim 1, wherein the coating material comprises powdered enamel.

13. The powder preparation system of claim 1, further comprising means for measuring the moisture content of the coating material and for regulating the flow rate of the conditioned compressed-gas as a function of the measured moisture content of the coating material.

14. The powder preparation system of claim 11, further including at least two heating devices coupled to the preparation container for separately and independently heating different, axially differentiated, zones within the fluidized powder, the powder inlet of the container being located in the vicinity of one of the zones and the powder outlet of the preparation container being located in another heating zone which is furthest away from the heating zone which lies in the vicinity of the powder inlet.

15. A powder preparation system for preparing coating powder suitable for being sprayed on articles, the preparation system comprising:

a preparation container for holding coating powder in a fluidized state;

a powder inlet for feeding powder into the preparation container;

a powder inlet for removing therethrough moistened powder from the preparation container;

means for producing a moisturized fluid having a predetermined moisture content;

a fluid inlet for feeding the moisturized fluid into the preparation container as a function of the moisture content of the fluidized powder in the preparation container;

the means for producing the moisturized fluid comprising a compressed-gas conditioning device for producing as the moisturized fluid a water-enriched stream of compressed air having the predetermined moisture content;

the moisturized fluid producing means comprising a compressed-air moistener for holding water therein, a compressed-air inlet in the moistener, a compressed-air outlet for the exit of compressed-air which has absorbed moisture from the water and means for heating the water in the moistener to a temperature that is higher than a temperature of the coating material in the preparation container;

at least one cooling device for condensing moisture from the compressed-air by cooling the compressed-air to a temperature which is not lower than the temperature prevailing in the preparation container but which is lower than the temperature prevailing in the compressed-air moistener; and a recirculation circuit for the fluid, the recirculation circuit including means for removing powder from the preparation container, mixing the powder with conditioned compressed-air, and returning the removed powder admixed with compressed-air to the preparation container.

16. The powder preparation system of claim 15, wherein the recirculation circuit comprises an injector, a suction tube disposed in the coating material in the container and coupled to the injector, and a fluid inlet, the stream of compressed-air being injected as a stream of conveying gas through the injector in a manner whereby the injector draws powder through the suction tube and returns the powder to the preparation container through the fluid inlet, thereby imparting to the coating material the moisture contained in the compressed-gas.

17. The powder preparation system of claim 15, further comprising a branch line and means for directing through the branch line a portion of the compressed-gas into a lower region in the preparation container in a manner which is effective for maintaining the coating material in a fluidized state.

18. The powder preparation system of claim 15, further comprising a moisture sensor coupled to the container for measuring the moisture content of the powder in the preparation container, and including a pressure regulator for regulating the supply of conditioned compressed-air based on the moisture content of the fluidized powder.

19. The powder preparation system of claim 15, further comprising means for regulating the temperature of the conditioned compressed-gas.

20. The powder preparation system of claim 15, further comprising a powder holding container, powder transfer means for transferring powder from the preparation container to the holding container, the powder transfer means being coupled to the powder outlet of the preparation container.

21. The powder preparation system of claim 15, wherein the stream of compressed-gas is effective to impart to enamel powder disposed in the preparation container a moisture content in the range of 0.04 to 0.08 wt. %.

22. The powder preparation system of claim 21, wherein the moisture content imparted to the powder is about 0.06 wt. %.

23. A method for preparing powder for being sprayed on articles, the method comprising the steps of:

disposing powder in a preparation container;

maintaining the powder in the preparation container in a fluidized state;

generating a stream of compressed-gas and imparting to the stream of compressed-gas a controllable predetermined moisture content;

providing an air tight bell having a substantially open bottom and disposing the bell in the container, at least partially immersed in the coating material with the open bottom facing down to create a material free space within the bell;

admixing the stream of compressed and moistened gas with the fluidized powder in the container to impart to the powder a second predetermined moisture content by directing the stream of compressed and moistened gas into the bell for distributing the compressed gas through the open bottom of the bell; and removing powder form the preparation container, mixing the powder with conditioned compressed-air, and returning the removed powder admixed with compressed-air to the preparation container.

24. The method of claim 23, further comprising controlling the temperature of the compressed-gas.

25. The method of claim 24, further comprising controlling the rate at which the compressed-gas is supplied for being admixed with the powder.

26. The method of claim 23, further comprising heating different, axially differentiated, regions of the fluidized powder in the first container independently of one another.

27. The method of claim 23, further comprising transferring quantities of powder form the preparation container to a holding container and drawing prepared powder from the holding container and supplying same to a spraying device.

* * * * *